United States Patent Office 3,471,231
Patented Oct. 7, 1969

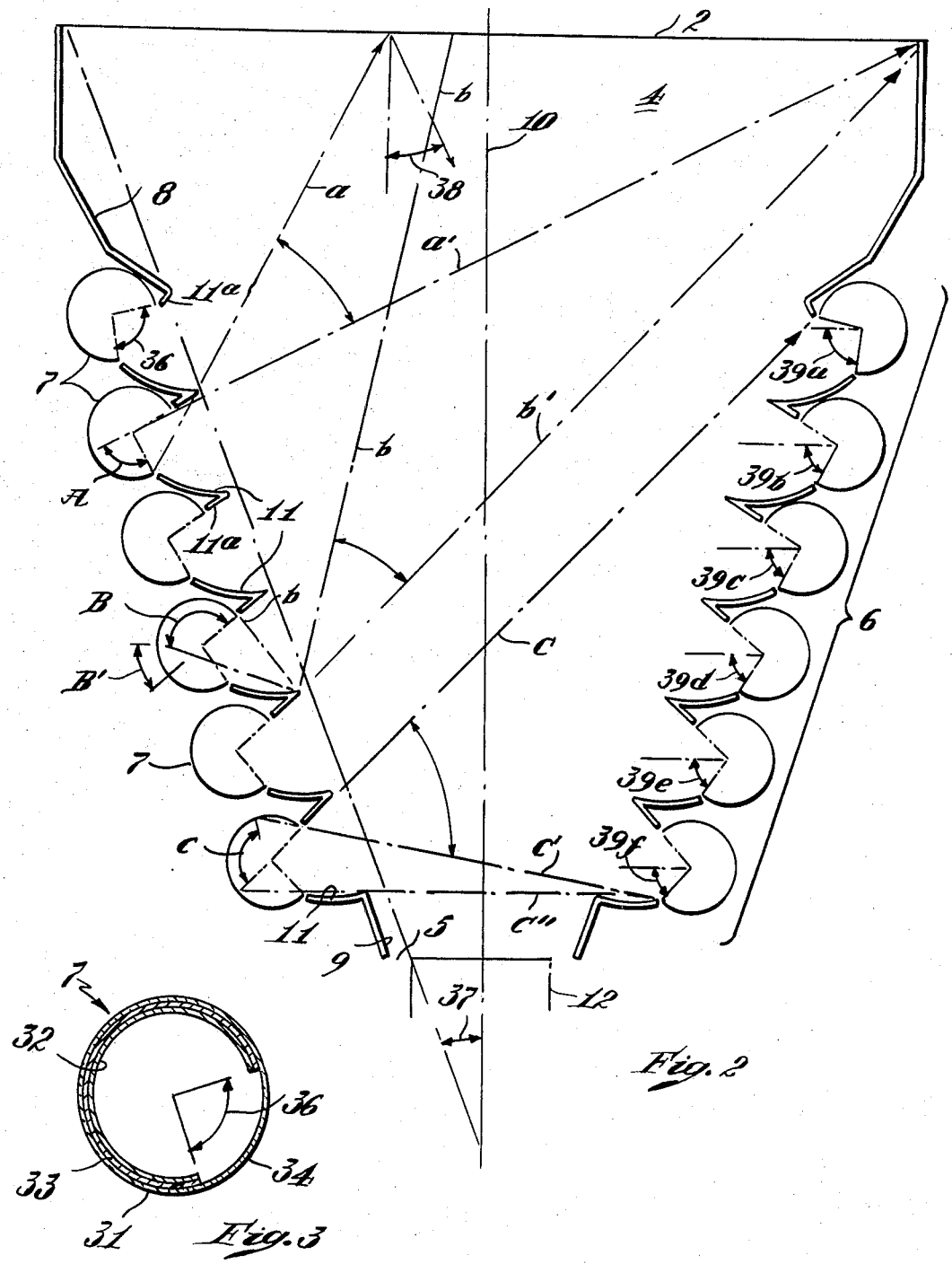

3,471,231
OPTICAL ILLUMINATING APPARATUS
William B. Elmer, Boston, Mass., assignor to Dennison Manufacturing Company, Framingham, Mass., a corporation of Nevada
Filed June 7, 1967, Ser. No. 644,154
Int. Cl. G03b 27/54
U.S. Cl. 355—70  5 Claims

ABSTRACT OF THE DISCLOSURE

An optical illuminating apparatus for a document copier having a plurality of elongated tubular arc discharge lamps arranged in parallelism to each other and with spaced relationship to the optical axis on one side of a glass platen. The envelope of each lamp has a circumference partly forming a transparent aperture and partly covered with a coating which reflects light through the aperture such that each lamp produces direct illumination and illumination by rays from an opposite lamp reflected from the reflecting coatings of each lamp.

---

In photographic illumination, for example in document copiers, it is necessary to provide intense light for short exposures, and at the same time limit the bulk of the light source because of space limitations. Arc discharge devices such as fluorescent lamps are desirable because of their high luminous efficacy and low operating temperature, but the low light output per unit volume of such lamps requires that several of them be used to provide an adequate light intensity and thus raises space problems.

It is the object of the present invention to utilize highly efficacious arc discharge devices, particularly fluorescent lamps, in a light box which controls the distribution of light on an area to be illuminated and which makes highly efficient use of the light emitted by the lamps.

According to the invention optical apparatus for illuminating an area comprises a light box formed by opposed reflective end walls connected by symmetric illuminating arrays, each array including a plurality of arc discharge lamps disposed parallel to each other and to said area in a series extending away from said area and converging toward a central axis through said area, each lamp having an elongate tubular envelope whose circumference partly forms a transparent aperture facing the opposite array and is partly covered with a reflecting coating, and each array including a plurality of specular reflectors each facing said area and disposed adjacent the edge of a lamp aperture remote from said area such that said area is illuminated by direct rays from each lamp of an array, by once reflected rays from each reflector of an array and by rays from an opposite array reflected from the reflecting coatings of each lamp, whereby substantially all the light from each lamp is received by the whole of said area, thereby to minimize a change in light distribution on extinction of one or more lamps.

For the purpose of illustration a typical embodiment of the invention is shown in the accompanying drawings in which:

FIG. 2 is an optical diagram of the light box; and

FIG. 3 is a section of a known fluorescent aperture lamp used in the light box.

Figure 1:
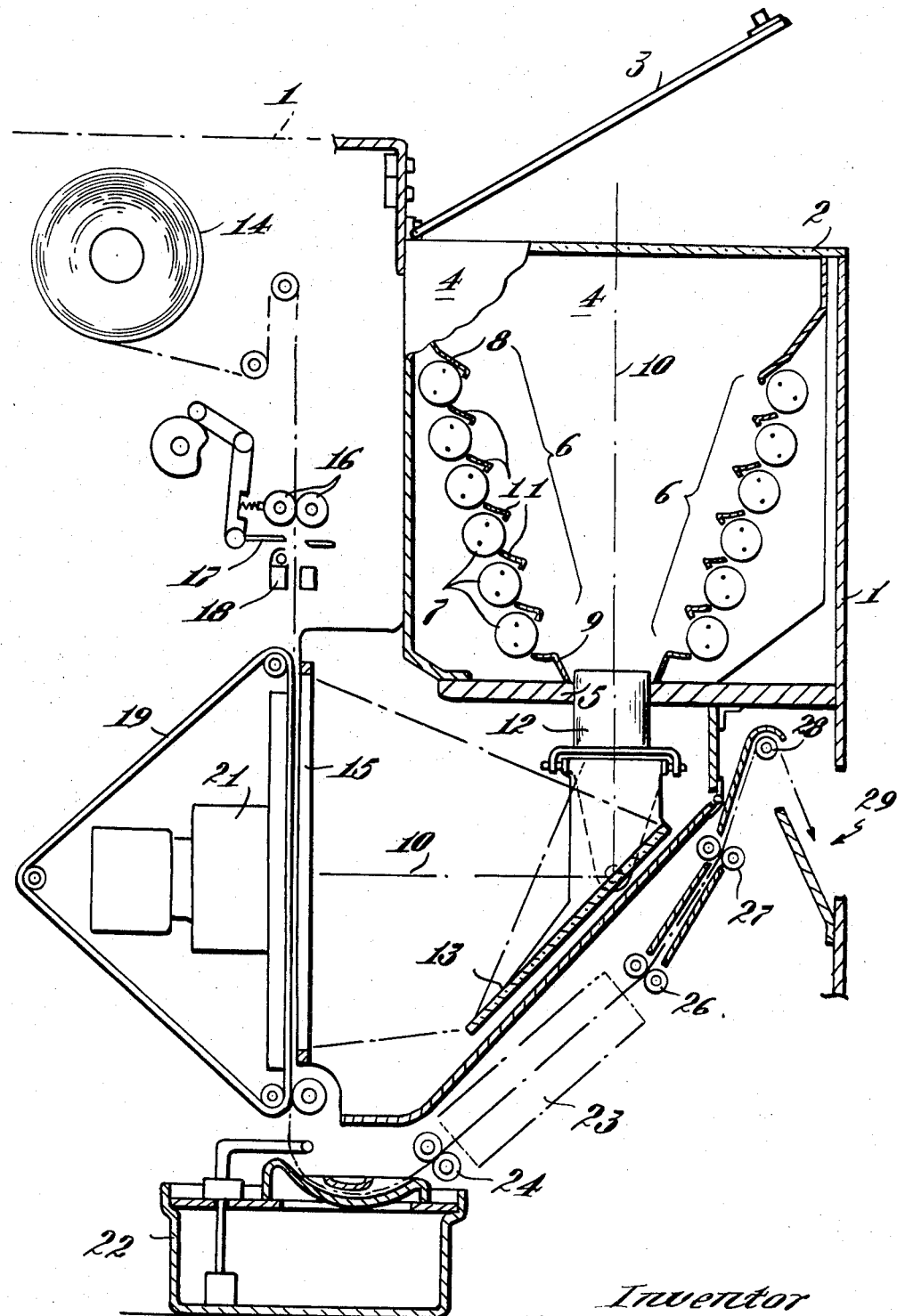
FIG. 1 is a side elevation, partly broken away of a photographic document copier embodying a light box according to the present invention.

Shown in FIG. 1 is an electrostatic copier comprising an outside housing 1, which supports a rectangular glass platen or window 2 with a movable cover 3. Below the platen is a light box formed by plane, parallel end walls 4, two opposed symmetrical illuminating arrays 6 of lamps 7, upper and lower reflectors 8 and 9, and reflectors 11 intermediate the lamps. The lamps 7 and reflectors 8, 9 and 11 are suitably mounted to extend parallel to each other and to the platen between the end walls 4. A document placed face down on the platen 2 is illuminated by the arrays 6, and an image of the document is projected by a lens 12 on a folded optical axis 10 to a print window 15 with one reflection from a plane mirror 13. The lens 12 is surrounded by a horizontal wall 5.

Electrostatic print paper is drawn by feed rolls 16 from a supply roll 14 to a cutter 17 where sheets are severed. The sheets pass through a corona discharge device 18 which electrostatically charges the sheet. The severed sheet is gripped by a vacuum drawn through an endless belt 19 by a pump 21 and carried to the print window 12 where it is centered on the axis 10. In the window the sheet is exposed to the image of the document, losing its charge where lighted so as to leave a latent electrostatic image elsewhere on the sheet. The electrostatic image is pigmented in a developer 22 and fixed in a drier 23, and carried by rolls 24, 26, 27 and 28 to an exit 29.

The light box, which is the subject of this invention, is shown in an enlarged optical diagram in FIG. 2. The light sources used in the light box are aperture fluorescent lamps as shown in section in FIG. 3. Such a conventional lamp 7 comprises a tubular glass envelope 31 only partially coated around its interior wall with a phosphor layer 32 overlying a reflective coating 33. The phosphor and coating are of very high diffuse, specific reflectance, reflecting an appreciable portion of light after several reflections. The partial coating of the glass wall leaves a transparent window 34 extending the length of the lamp and subtending an angle 36 usually between 30° to 90°, 90° being preferred.

The lamps 7 and reflectors 8, 9 and 11 are disposed substantially parallel to and just outside an angle 37 converging toward the lens 12. The angle 37 is the acceptance angle within which light rays reaching the lens 12 will be transmitted by the lens. The intermediate reflectors 11 mask the lens from any rays radiating from the lamps 7. Additionally the reflectors 11 mask the glass platen from light rays which, when incident on the specularly reflecting surface of the glass would be reflected to the lens 12 within its acceptance angle. For example, the extreme ray *a* emitted from a lamp 7 is reflected by the platen 2 at an angle 38 to the opposite array 6 rather than to the lens 12. All other rays from the phosphor coatings of the lamps are reflected by the platen at angles away from the lens. The undersides of each reflector 11 are masked from the lamp and reflector 11 below by a specularly reflective re-entrant tailpiece 11a on such reflector 11.

Each lamp 7 is oriented on its lengthwise axis so that its window faces the opposite array. In such orientation the lower edge of the windows will subtend arcs 39a to 39f with respect to a horizontal plane parallel to the platen 2 and normal to the lens axis 10. For a light box having a 9 by 14 inch platen and a lens to platen height of approximately 15 inches, the lamps are vertically spaced between approximately 1¾ to 2 inches, and the degrees of arcs 39a to 39f are respectively 70°, 58°, 56°, 53°, 48° and 43°.

While the phosphor coating 32 of each lamp comprises a diffusely reflecting surface of high reflectance, the end walls 4, and reflectors 8, 9 and 11 are highly specular reflectors, for example bright polished aluminum, with a specific reflectance of 85 percent, more or less. Because the end walls 4 are plane reflectors, like ordinary mirrors, they merely fold light rays in planes normal to FIG. 2 and including the exemplary rays, *a*, *b*, *c*, etc. That is, rays in the same plane as the exemplary rays but directed out of the plane of FIG. 2 will conform to the classes of reflection described with reference to the exemplary rays.

Light rays emanating from the phosphors of lamps 7 fall mainly in the following classes:

I—Rays radiated directly from the phosphor to the platen—As shown by the extreme rays a and a' light from an arc A of the phosphor coating passes through the lamp window directly to the platen.

II—Rays reflected once to the platen—Ray emanating from the arc B of the phosphor and falling on the arcuate reflector 11 below will mostly be reflected once by reflectors 11 to the platen. The extreme rays b and b' indicate the area of the platen covered by such once reflected rays.

III—A small fraction of direct and once reflected rays will strike the upper reflectors 8 and be reflected on the right and left ends of the platen, intensifying the illumination of the ends.

IV—Direct rays to opposite array—The remainder of the rays originating in the lamps of one array will radiate directly to the opposite array. Rays c and c' are examples in this class. A substantial portion of such rays fall directly on the highly reflective phosphor coating of the opposed lamps. From the phosphor the rays are diffusely reflected in one of the classes I to IV, and by one, several or many more reflections are directed to the platen. A lesser portion of such rays falls on the opposite reflectors 11 and is reflected upwards or downwards whence it is either used by subsequent reflections or is absorbed and dissipated by multiple interflections within the box or enters the lens at harmless angles beyond the limiting acceptance angle. A minor amount of light straying below either array is reflected by the lower reflectors 9 in useful or non-injurious directions or diffused by the wall 5.

Necessarily non-uniform lighting of the print window 15 is effected by the light box. Because of light attrition by the lens 12 dependent on the angle at which rays approach the lens the platen 2 must be more brightly lighted at its ends and corners than at its center in order that the image on the print window 15 be uniformly illuminated. This desired light distribution is obtained by orienting the lamps so that rays of classes I to III fall on the opposite end of the platen 2 or its adjacent wall 8.

The light box described makes compact use of cool fluorescent lamps of high efficacy with a light utilization of approximately 65 percent to 70 percent of the light emitted by the phosphors, notwithstanding that the lamp arrays must extend away from the platen without obscuring the space between the platen and lens. Sufficient illumination is provided to reduce the exposure time from 5 seconds to 1.3 seconds for a given sensitivity of paper and lamp output. The filaments of the fluorescent lamp may be continuously heated during operating hours to emission sufficient to strike an arc instantly when arc voltage is applied. While six pairs of lamps are shown, any pair of opposed lamps may be omitted or intentionally extinguished since each lamp contributes to the illumination of the whole platen area. Also for this reason, extinction of an odd number of lamps will cause a minimal change in the light distribution on the platen.

While one desirable embodiment of the invention has herein been disclosed by way of example, it is to be understood that the invention is broadly inclusive of any and all modifications falling within the terms of the appended claims.

I claim:
1. Optical illuminating apparatus comprising:
   at least one pair of arc discharge lamps, each having an elongate tubular envelope whose circumference partly forms a transparent aperture and is partly covered with a coating reflecting light through said aperture, and
   means to support said lamps in parallelism to each other and with the aperture of each lamp facing and transmitting light to the aperture of the opposed lamp,
   whereby each lamp produces illumination by direct rays from each lamp and by rays from an opposite lamp reflected from the reflecting coatings of each said lamp.
2. Optical apparatus according to claim 1 for illuminating an area, characterized by
   a light box formed by opposed reflective end walls connected by symmetric illuminating arrays,
   each array including a plurality of said arc discharge lamps disposed parallel to said area in a series extending away from said area and converging toward a central axis through said area,
   and each array including a plurality of specular reflectors each facing said area and disposed adjacent the edge of a lamp aperture remote from said area such that said area is illuminated by direct rays from each lamp of an array, by once reflected rays from each reflector of an array and by rays from an opposite array reflected from the reflecting coatings of each lamp,
   whereby substantially all the light from each lamp is received by the whole of said area, thereby to minimize a change in light distribution on extinction of one or more lamps.
3. Apparatus according to claim 2 wherein said area is defined by a specularly reflecting surface and a lens is disposed on the axis of said area at the converging end of said arrays, to project an image of said area.
4. Apparatus according to claim 3 wherein each said specular reflector masks direct rays from the coating of an adjacent lamp which would be incident on said specularly reflecting surface at an angle to be reflected to said lens.
5. Apparatus according to claim 2 wherein said arrays converge toward said lens at an angle substantially equal to and outside the acceptance angle of the lens.

References Cited

UNITED STATES PATENTS 2,153,186   4/1939   Henderson _____ 355—70
3,251,984   5/1966   Colterjohn _____ 355—70

NORTON ANSHER, Primary Examiner
RICHARD A. WINTERCORN, Assistant Examiner

U.S. Cl. X.R.
240—1.3; 250—77; 355—37